C. P. PARKER.
BARBED-FENCES.
No. 194,260. Patented Aug. 14, 1877.
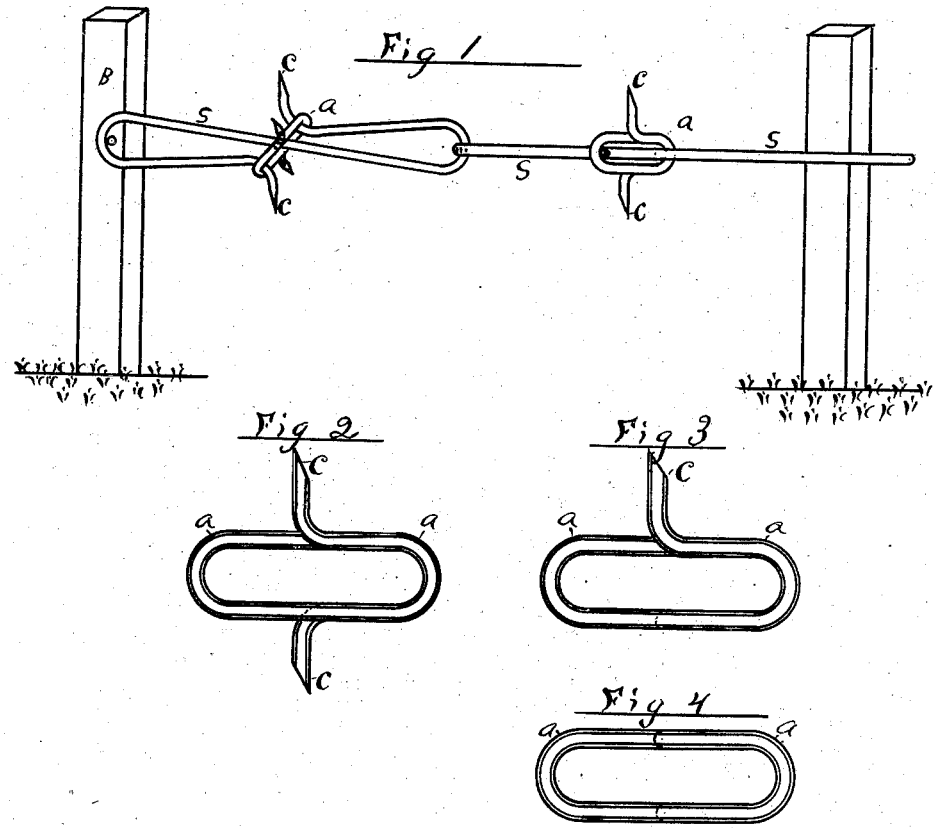
Witnesses
Thos. H. Hutchins.
Wm. J. Hutchins
Inventor
Charles P. Parker.

UNITED STATES PATENT OFFICE.

CHARLES P. PARKER, OF JOLIET, ILLINOIS.

IMPROVEMENT IN BARBED FENCES.

Specification forming part of Letters Patent No. 194,260, dated August 14, 1877; application filed April 10, 1877.

*To all whom it may concern:*

Be it known that I, CHARLES P. PARKER, of the city of Joliet, in Will county and State of Illinois, have invented certain Improvements in Barbed Fences, the construction and operation of which I will proceed to explain, reference being had to the annexed drawings, making a part of this specification, in which—

Figure 1 is a perspective view; and Figs. 2, 3, and 4 are perspective views of the barbed connecting-rings $a$.

In the drawing, $s$ represents an S-shaped link, hooked together to form a continuous cable, as shown in Fig. 1, and having each extremity turn out in a pointed barb at right angles with the length of the link or cable.

The ring $a$ is used to connect the two extremities of the link $s$ in the manner shown at Fig. 1. This ring $a$ is provided with barbs $c$, formed by pointing the two extremities of the wire of which it is constructed, so that when the links $s$ are united by it there will be barbs pointing in four directions, as shown in Fig. 1.

However, the rings $a$ may be constructed with only one or no barbs, as shown in Figs. 3 and 4.

The whole fence is intended to be constructed of wire, and forming, when complete and in use, a continuous barbed cable of links, as set forth, for the purpose of turning stock.

Some of the advantages in this construction is that the fence may be unhooked at any place, to admit the passage from one field to another without disturbing the whole length of the fence. Also, the fence is very elastic, so that it does not require as much stretching, as in the case of a rigid wire, and will not so seriously injure stock that might run against it, and, also, is large enough, so that it can be seen by stock more readily than a small wire.

Having thus described my invention, what I claim as new, and desire to secure by Letters Patent, is as follows, to wit:

The barbed link $s$, in combination with the rings $a$, connecting the extremities of the link $s$, in the manner and for the purposes set forth.

CHARLES P. PARKER.

Witnesses:
THOS. H. HUTCHINS,
WM. J. HUTCHINS.